(12) United States Patent
Kim et al.

(10) Patent No.: US 8,290,264 B2
(45) Date of Patent: Oct. 16, 2012

(54) IMAGE PROCESSING METHOD AND APPARATUS

(75) Inventors: Jun-mo Kim, Seoul (KR); Young-su Moon, Seoul (KR); Yong-seok Yoo, Seoul (KR); Yoon-kyung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1261 days.

(21) Appl. No.: 11/898,205

(22) Filed: Sep. 10, 2007

(65) Prior Publication Data

US 2008/0123960 A1    May 29, 2008

(30) Foreign Application Priority Data

Nov. 28, 2006   (KR) .................. 10-2006-0118562

(51) Int. Cl.
*G06K 9/34*    (2006.01)
(52) U.S. Cl. ........................................ 382/173
(58) Field of Classification Search .................. 382/103, 382/106, 107, 154, 162, 164, 170–173, 285; 348/152, 154, 169, 625; 358/2.1, 537
See application file for complete search history.

(56) References Cited

U.S. PATENT DOCUMENTS

| 5,557,684 | A | 9/1996 | Wang et al. | |
|---|---|---|---|---|
| 5,790,086 | A | 8/1998 | Zelitt | |
| 6,157,733 | A | 12/2000 | Swain | |
| 6,252,982 | B1 | 6/2001 | Haisma et al. | |
| 6,903,782 | B2 * | 6/2005 | Herman et al. | ............... 348/625 |

OTHER PUBLICATIONS

Office Action mailed Aug. 18, 2011 in copending U.S. Appl. No. 11/898,780.
Office Action mailed Apr. 29, 2011 in copending U.S. Appl. No. 11/898,780.
Yoon et al., "Moving Object Segmentation with Accurate Boundary Using Color and Motion," Department of Electrical Engineering, KAIST, 6 pgs in English) Published on 2000.
Korean Office Action in Korean Patent Application No. 10-2006-0101571 dated Nov. 27, 2008.
Elgammal et al., "Non-parametric Model for Background Subtraction," Computer Vision Laboratory, Springer-Verlag Berlin Heidelberg 2000, pp. 751-767 (In English).
Wang et al., "Representing Moving Images with Layers," IEEE Transactions on Image Processing, vol. 3, No. 5, pp. 625-638, Sep. 1994 (In English).
Kolmogorov et al., "Bi-Layer segmentation of binocular stereo video," Microsoft Research Ltd., 8 pages. (In English).
Philip Hilaire Sean Torr, "Motion Segmentation and Outlier Detection", Department of Engineering Science University of Oxford, Hilary Term, 1995, 9 unnumbered pages and pp. 1-248 (In English).
U.S. Appl. No. 11/898,780, Sep. 14, 2007, Jun-Mo Kim et al., Samsung Electronics Co., Ltd.

(Continued)

*Primary Examiner* — Duy M Dang
(74) *Attorney, Agent, or Firm* — Staas & Halsey LLP

(57) ABSTRACT

Provided is an image processing method and apparatus. The image processing method includes receiving an image signal an image, detecting a feature of the image, and analyzing the image signal based on the detected feature of the image, performing segmentation on the image signal according to the analysis result, and performing image processing on the image signal according to the segmentation result.

16 Claims, 7 Drawing Sheets
(3 of 7 Drawing Sheet(s) Filed in Color)

OTHER PUBLICATIONS

"Occlusion edge blur: A cue to relative visual depth," Marshall et al., Journal of the Optical Society of America, Apr. 1996 (pp. 1-14).
Notice of Allowance mailed Feb. 13, 2012, in copending U.S. Appl. No. 11/898,780.
"Automatic Segmentation of Moving Objects for Video Object Plane Generation," Meier et al., IEEE Transactions on Circuits and Systems for Video Technology, vol. 8, No. 5, Sep. 1998 (pp. 525-538).
"Multiple View Geometry in Computer Vision," Hartley et al., Cambridge University Press (2003) (five pages, numbered 239-241 and 287-288).
"The Dip Test of Unimodality," J. A. Hartigan et al., The Annals of Statistics, vol. 13, Issue 1, Mar. 1985 (pp. 70-84).
"Using Kernel Density Estimates to Investigate Multimodality," B.W. Silverman, Journal of the Royal Statistical Society. Series B (Methodological), vol. 43, No. 1, 1981 (pp. 97-99).
"Outlier Detection and Motion Segmentation," P.H.S. Torr et al., Robotics Research Group, Department of Engineering Science, University of Oxford (twelve pages).
"Segmentation of Moving Objects in Image Sequence: A Review," Dengsheng Zhang et al., Circuits Systems Signal Processing vol. 20, No. 2, 2001 (pp. 143-183).
"Bilayer Segmentation of Live Video," A. Criminisi et al., Microsoft Research Ltd., Cambridge, CB3 0FB, United Kingdom, (pp. 1-8) http://research.microsoft.com/vision/cambridqe/i2i.
"Contour and Texture Analysis for Image Segmentation," Jitendra Malik et al., International Journal of Computer Vision 43(1), Jul. 27, 2001 (pp. 7-27).
"Normalized Cuts and Image Segmentation," Jianbo Shi et al., IEEE Transactions on Pattern Analysis and Machine Intelligence, vol. 22, No. 8 Aug. 2000 (pp. 888-905).
"Active Contours Without Edges," Tony F. Chan et al., IEEE Transactions on Image Processing, vol. 10, No. 2 Feb. 2001 (pp. 266-277).
"Optimal Approximations by Piecewise Smooth Functions and Associated Variational Problems," David Mumford et al., Communications on Pure and Applied Mathematics, vol. XLII, 1989, (pp. 577-685).
"Rapid Object Detection using a Boosted Cascade of Simple Features," Paul Viola et al., IEEE, 2001 (pp. 511-518).
"Recovering Human Body Configurations using Pairwise Constraints between Parts," Xiaofeng Ren et al., Computer Science Division, University of California, Berkeley, CA 94720 (pp. 1-8).
"Multiple View Geometry in Computer Vision," Hartley et al., Cambridge University Press (2003) (two pages, numbered 434-435).
Notice of Allowance mailed Jun. 13, 2012, in copending U.S. Appl. No. 11/898,780.

\* cited by examiner (ORIGINAL IMAGE)

(PROCESSED IMAGE)

(ORIGINAL IMAGE)

(FOREGROUND/BACKGROUND BINARY MAP)

(PROCESSED IMAGE)

(ORIGINAL IMAGE)

(PRODUCT OF FOREGROUND/BACKGROUND
BINARY MAP AND LOCAL CONFIDENCE MAP)

(PROCESSED IMAGE)

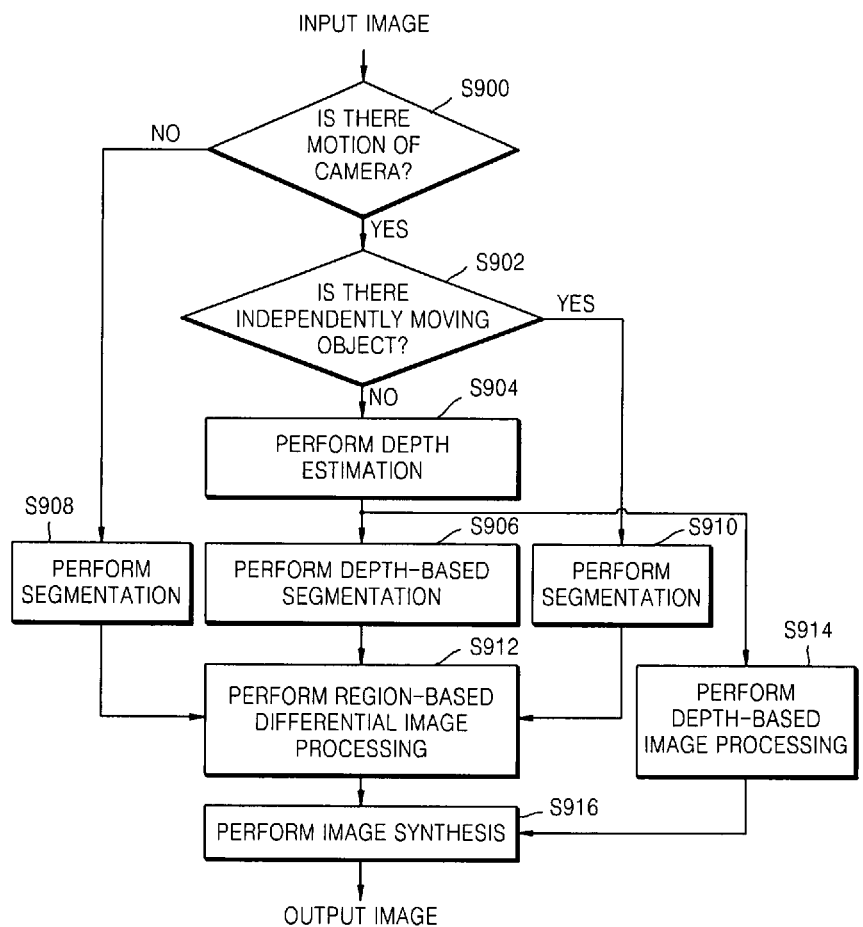

IMAGE PROCESSING METHOD AND APPARATUS

CROSS-REFERENCE TO RELATED PATENT APPLICATION

This application claims the benefit of Korean Patent Application No. 10-2006-0118562, filed on Nov. 28, 2006, in the Korean Intellectual Property office, the disclosure of which is incorporated herein in its entirety by reference.

BACKGROUND OF THE INVENTION

1. Field of the Invention

The present invention relates to image processing, and more particularly, to an image processing method and apparatus, in which an image is segmented into regions and image processing is performed on each of the regions.

2. Description of the Related Art

Research on segmentation associated with digital video signal processing has steadily attracted attention. In the field of segmentation, which has become an essential part of various multimedia applications, new techniques are being applied for effective analysis and representation.

The video signal segmentation has applications in various fields and the segmentation result can be effectively used in display quality processing, video encoding, and object recognition.

In the field of display quality processing, a three-dimensional (3D) display and a 3D TV enhance a 3D effect using binocular disparity. However, as binocular disparity increases, eyes' fatigue increases and a ghost effect occurs. A main reason binocular disparity causes eyes' fatigue is that vergence-accommodation conflict arises.

Persons can feel a cubic effect because their brains reconstruct a 3D world using a monocular depth cue, such as brightness information, or a pictorial depth cue included in a two-dimensional (2D) image as well as binocular disparity. By processing the monocular depth cue well, the cubic effect can be enhanced. For example, persons feel that a bright object is closer to them than a dark object even when those objects are the same distance from them. By using this feature, the brightness of a close object is increased and the brightness of a distant object or a background is reduced, thereby improving a depth effect and a 3D effect.

There have been attempts to improve the 3D effect of a 2D image using image processing based on only a monocular depth cue without relying on binocular disparity.

U.S. Pat. No. 6,157,733 entitled "Integration of Monocular Cues to Improve Depth Perception" and U.S. Pat. No. 6,252,982 entitled "Image Processing System for Handling Depth Information" disclose techniques for extracting an object of interest from an input image and differentially processing the extracted object.

Those techniques are intended to improve a 3D effect on the assumption that segmentation has been performed or on the alternative assumption that depth estimation has been performed.

However, those conventional techniques have some problems. First, a 2D video cannot be segmented all the times. Also depth estimation from a 2D video is not always possible. For example, when a camera moves and an image contains an independently moving object, depth estimation cannot be performed on the image.

When a 3D effect is increased under inaccurate segmentation or depth estimation, degradation in display quality, such as unnatural screen display, occurs as the cost of 3D effect improvement.

SUMMARY OF THE INVENTION

The present invention provides an image processing method and apparatus, in which a 3D effect can be enhanced by performing segmentation based on a feature of an image and effectively processing the image based on the segmentation result.

The present invention also provides an image processing method and apparatus, in which a 3D effect can be enhanced by performing depth estimation based on a feature of an image and effectively processing the image based on the depth estimation result.

The present invention also provides an image processing method and apparatus, in which segmentation and depth estimation are performed, an image is processed separately based on the segmentation result and the depth estimation result, and the processed images are synthesized, thereby enhancing the 3D effect of the image.

The present invention also provides an image processing method and apparatus, in which global confidence and local confidence are estimated during segmentation and depth estimation and the estimated global confidence and local confidence are used for image processing, thereby generating a natural image whose display quality does not degrade.

According to one aspect of the present invention, there is provided an image processing method including receiving an image signal representing an image, detecting a feature of the image, and analyzing the image signal based on the detected feature of the image, performing segmentation on the image signal according to the analysis result, and performing image processing on the image signal according to the segmentation result.

According to another aspect of the present invention, there is provided an image processing method including receiving an image signal an image, analyzing the image signal, and performing segmentation and depth estimation on the image according to the analysis result, differentially processing a foreground region and a background region of the segmented image according to the segmentation result, and performing image processing on the image signal according to the depth estimation result.

According to another aspect of the present invention, there is provided an image processing apparatus including an image analysis unit, a segmentation unit, and an image processing unit. The image analysis unit receives an image signal an image, detects a feature of the image, and analyzes the image signal based on the detected feature of the image. The segmentation unit performs segmentation on the image signal according to the analysis result of the image analysis unit. The image processing unit performs image processing on the image signal according to the segmentation result of the segmentation unit.

According to another aspect of the present invention, there is provided a computer-readable recording medium having recorded thereon a program for implementing the image processing method.

Details and improvements of the present invention are disclosed in dependent claims.

BRIEF DESCRIPTION OF THE DRAWINGS

The patent or application file contains at least one drawing executed in color. Copies of this patent or patent application publication with color drawings will be provided by the Office upon request and payment of the necessary fee. The above and other features and advantages of the present invention will become more apparent by describing in detail exemplary embodiments thereof with reference to the attached drawings in which:

FIG. 9 is a flowchart illustrating an image processing method according to another exemplary embodiment of the present invention.

DETAILED DESCRIPTION OF THE INVENTION

Hereinafter, exemplary embodiments of the present invention will be described in detail with reference to the accompanying drawings.

Figure 1:
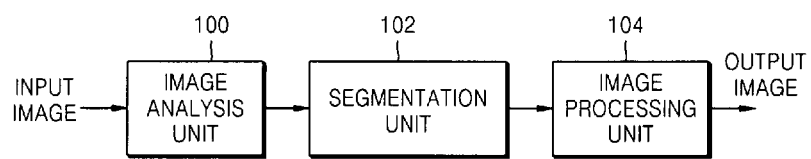
FIG. 1 is a schematic block diagram of an image processing system according to an exemplary embodiment of the present invention.

FIG. 1 is a schematic block diagram of an image processing system according to an exemplary embodiment of the present invention.

The image processing system according to an exemplary embodiment of the present invention analyzes an input image, segments the image into a foreground region and a background region based on the analysis result, and differentially processes the foreground region and the background region, thereby improving a three-dimensional (3D) effect of the input image. Referring to FIG. 1, the image processing system includes an image analysis unit 100, a segmentation unit 102, and an image processing unit 104.

First, an image taken by an image signal input device (not shown) including a moving image taking means like a video camera, a digital camera, or a camera phone, such as a TV broadcasting image, a personal content image, or a stored media play image, is input. Here, the image may be an analog image or a digital image, but it is assumed that the input image is a digital image. Image sequences converted into a digital image signal are sequentially input to the image analysis unit 100. Preferably, the input image includes a two-dimensional (2D) image signal.

The image analysis unit 100 analyzes the image signal received from the image signal input device (not shown) based on a feature of the image signal, i.e., whether the image has motion, a camera taking the image moves, or a foreground object that moves independently in the image exists, and provides an image analysis signal to the segmentation unit 102. Optionally, the image analysis unit 100 may include the segmentation unit 102.

The segmentation unit 102 receives the image analysis signal from the image analysis unit 100 and segments the image signal into a foreground region and a background region according to the received image analysis signal. In an embodiment of the present invention, the image analysis signal indicates one of mode [1] through mode [6]. The segmentation unit 102 performs segmentation algorithms suitable for mode [1] through mode [6] to segment an image into a foreground region and a background region.

A criterion for classifying the image into one of the 6 image modes indicated by the image analysis signal is based on whether a camera moves and a moving foreground object exists. In mode [1], a camera is in a still state and a foreground object does not exist. In mode [2], a camera is in a still state and a foreground object exists, but is in a still state. In mode [3], a camera is in a still state and a foreground object exists and moves independently. In mode [4], a camera moves and a foreground object does not exist. In mode [5], a camera moves and a foreground object exists, but is in a still state. In mode [6], a camera moves and a foreground object exists and moves independently.

Although an image is classified into one of 6 modes to explain exemplary embodiments of the present invention, the scope of the present invention is not limited to such classification.

The input image signal is analyzed according to its feature and segmentation is performed in an appropriate image mode, wherein there is a segmentation algorithm suitable for each image mode. For example, since there is no foreground object in mode [1] and mode [4], segmentation into a foreground region and a background region is not required. Since a camera is in a still state and a foreground object exists in mode [2], but is in a still state, the entire image is in a still state. Thus, a still image object segmentation method is useful for mode [2]. Since a camera is in a still state and a foreground object moves independently in mode [3], the still image object segmentation method is not applicable to mode [3]. However, since an image is taken by a still camera, a background does not move and only a foreground object moves. Therefore, the foreground region and the background region can be effectively segmented from each other using a background subtraction method. Since a camera moves and a foreground object does not exist in mode [4], segmentation is not required. In mode [5], a camera moves and a foreground object is in a still state like a background. Therefore, a depth estimation method using extraction of a 3D structure from motion of the camera can be applied to mode [5]. Thus, segmentation can be performed using depth information obtained by depth estimation. Since a camera moves and a foreground object moves independently in mode [6], unlike in mode [5], depth estimation is not applicable. Thus, a segmentation method using 3D motion is suitable for mode [6].

The image processing unit 104 receives segmentation information, i.e., information about the foreground region and the background region of the image, from the segmentation unit 102 and differentially processes the foreground region and the background region based on the received segmentation information.

In an exemplary embodiment of the present invention, the image processing unit 104 performs image processing such as a brightness process, a focus process, a fog process, a sharpness process, a contrast process, an edge enhancing process, or a chromosteropsis process.

The brightness process involves increasing the brightness of the foreground region and reducing the brightness of the background region. The focus process involves maintaining the foreground region clear and blurring the background region. The sharpness process involves increasing the sharpness of the foreground region. The contrast process involves increasing the contrast of the foreground region. The edge enhancing process involves processing the edge of the foreground region to be clearer. The chromosteropsis process involves mixing the background region with blue fog.

Each of those processes may be used independently or used with another process. Preferably, by using the edge enhancing process together with the focus process, the 3D effect of the image can be further improved.

Figure 2:
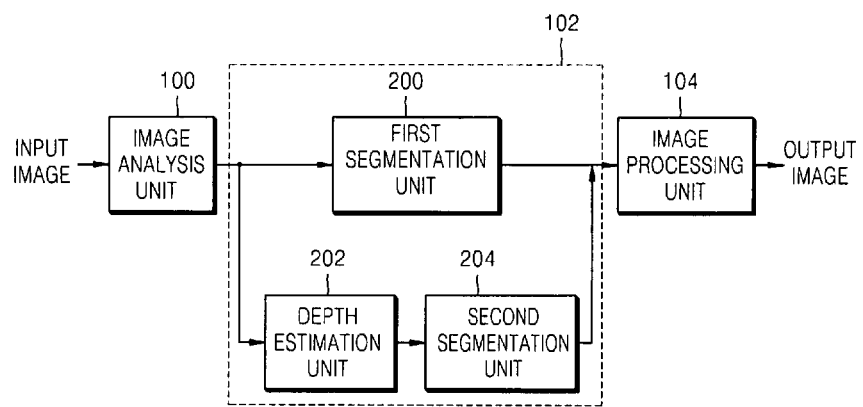
FIG. 2 is a detailed block diagram of a segmentation unit of the image processing system illustrated in FIG. 1.

FIG. 2 is a detailed block diagram of the segmentation unit 102 included in the image processing system illustrated in FIG. 1.

Referring to FIG. 2, the segmentation unit 102 includes a first segmentation unit 200, a depth estimation unit 202, and a second segmentation unit 204.

An input image can be broadly classified into a depth estimation available type corresponding to a case where a camera moves and an independently moving object does not exist (mode [4] and mode [5]) and a depth estimation non-available type (mode [1], mode [2], mode [3], and mode [6]). When the image is of the depth estimation available type, depth estimation is performed and then segmentation is performed using depth for a case where depth-based segmentation is available, i.e., for mode [5].

The first segmentation unit 200 performs segmentation for the depth estimation non-available type. In other words, the first segmentation unit 200 performs segmentation for the depth estimation non-available type except for in mode [1] where a foreground object does not exist.

The depth estimation unit 202 performs depth estimation and depth distribution analysis for the image. Here, the depth of a pixel in the image indicates a distance between the pixel and the camera and depth information plays an important role in segmentation. In particular, since pixels included in a foreground region are close to the camera and pixels included in a background region are distant from the camera, segmentation can be performed using the depth information.

In an exemplary embodiment of the present invention, the depth estimation unit 202 estimates depth using extraction of a 3D structure from motion of the camera. If the distribution of the estimated depths has multiple peak values, i.e., is multi-modal, a corresponding image is classified as mode [5]. If the distribution of the estimated depths has a single peak value, i.e., is uni-modal, the image is classified as mode [4]. To determine whether a data distribution is uniform or not, a method such as a DIP test or kernel density estimation may be used.

When the image is classified as mode [4], the second segmentation unit 204 does not perform segmentation on the image because a foreground object does not exist. When the image is classified as mode [5], the second segmentation unit 204 segments a region whose depth is less than a threshold as a foreground region and a region whose depth is greater than the threshold as a background region according to the depth distribution.

In brief, the first segmentation unit 200 performs segmentation for mode [2], mode [3], and mode [6] and the second segmentation unit 204 performs segmentation for mode [5]. Thus, the image processing unit 104 performs image processing differentially for the foreground region and the background region.

Figure 3:
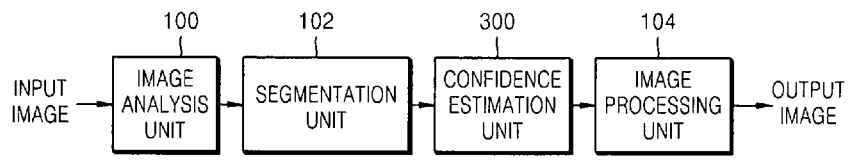
FIG. 3 is a schematic block diagram of an image processing system according to another exemplary embodiment of the present invention.

FIG. 3 is a schematic block diagram of an image processing system according to another exemplary embodiment of the present invention.

Referring to FIG. 3, the image processing system further includes a confidence estimation unit 300 in addition to components of the image processing system illustrated in FIG. 1. In other words, in another exemplary embodiment of the present invention, the confidence of segmentation is estimated during segmentation and image processing is performed based on the estimated confidence.

Here, confidence means the degree of accuracy of the foreground/background segmentation result. In an exemplary embodiment of the present invention, the feature of the foreground region and the feature of the background region are analyzed and it is checked whether each pixel of the image has a feature that is similar to the feature of the foreground region or the feature of the background region.

More specifically, the confidence calculation unit 300 calculates a probability p_FG(x) that a feature of a pixel x are similar to a feature of the foreground region and a probability p_BG(x) that the feature of the pixel x are similar to the feature of the background region and measures a ratio between them. For example, when the pixel x is determined to be in the foreground region, confidence is high when p_FG(x) is greater than p_BG(x). In particular, a log-likelihood ratio, i.e., log(p_FG(x)/p_BG(x)), ranges from −∞ to +∞ and confidence can be expressed using a monotonic function of the log-likelihood ratio.

When log(p_FG(x)/p_BG(x)) is substituted into Equation 1 and confidence is expressed with Equation 2, a confidence value ranges between 0 and 1.

$$\frac{e^x}{e^x + e^{-x}} \qquad (1)$$

$$\frac{p_{FG}^2(x)}{p_{FG}^2(x) + p_{BG}^2(x)} \qquad (2)$$

Similarly, when the pixel x is determined to be included in the background region, confidence can be expressed using Equation 3. Optionally, another monotonic function of log(p_FG(x)/p_BG(x)) may be used to express confidence.

$$\frac{p_{BG}^2(x)}{p_{FG}^2(x) + p_{BG}^2(x)} \qquad (3)$$

Here, a color histogram or color distribution estimation, e.g., kernel density estimation, may be used for p_FG(x). In this case, p_FG(x) models the extent to which the color of the pixel x can be determined to be similar to the colors of the foreground region based on the color distribution of pixels included in the foreground region.

Optionally, p_FG(x) may be estimated using image gradient or a 2D motion vector as well as a color.

Referring back to FIG. 3, the image processing unit 104 receives information about the confidence of segmentation from the confidence calculation unit 300 and performs image processing based on the information.

Among image processing methods like a brightness process, a focus process, a fog process, a sharpness process, a contrast process, an edge enhancing process, and a chromosteropsis process, the brightness process will be taken as an example.

When the brightness process is performed without using confidence, the brightness of a pixel in the foreground region is increased and the brightness of a pixel in the background region is reduced. At this time, an operation of increasing the brightness of a pixel in the foreground region while maintaining the hue and saturation of the pixel can be expressed as follows:

$$\begin{bmatrix} R \\ G \\ B \end{bmatrix}_{brightness} = (1+\alpha) \begin{bmatrix} R \\ G \\ B \end{bmatrix}_{original} \quad (4)$$

For example, when $\alpha$ is 0.3, it means that brightness is increased by 30%. Similarly, an operation of reducing the brightness of a pixel in the background region can be expressed as follows:

$$\begin{bmatrix} R \\ G \\ B \end{bmatrix}_{brightness} = (1-\alpha) \begin{bmatrix} R \\ G \\ B \end{bmatrix}_{original} \quad (5)$$

When a binary map indicating the foreground/background segmentation result, i.e., a foreground/background binary map, takes '1' for a pixel x determined to be included in the foreground region and takes −1 for a pixel x determined to be included in the background region, the brightness process can be expressed by applying the foreground/background binary map to Equation (4) and Equation (5), as follows:

$$\begin{bmatrix} R \\ G \\ B \end{bmatrix}_{brightness} = (1+\alpha\beta(x)) \begin{bmatrix} R \\ G \\ B \end{bmatrix}_{original}, \quad (6)$$

where $\beta(x)$ is a foreground/background binary map.

Figure 4A:
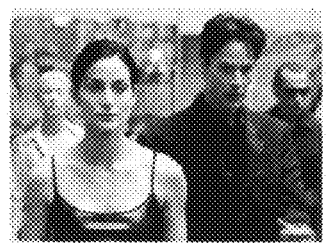
FIGS. 4A and 4B illustrate an image processing result according to another exemplary embodiment of the present invention.
Figure 4B:

When the foreground/background binary map, i.e., $\beta(x)$, is accurate, an image that undergoes the brightness process can have an improved 3D effect as illustrated in FIG. 4B when compared to the original image illustrated in FIG. 4A.

Figure 5A:
FIGS. 5A through 5C illustrate an image processing result according to another exemplary embodiment of the present invention.
Figure 5B:
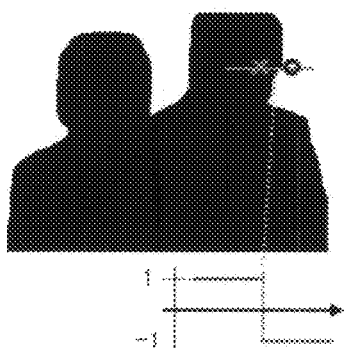
Figure 5C:

However, when the foreground/background binary map is not accurate as illustrated in FIG. 5B, a very unnatural image is obtained as illustrated in FIG. 5C.

In an exemplary embodiment of the present invention, global confidence for the foreground/background segmentation result is defined as $C_g$ and local confidence for the foreground/background binary map $\beta(x)$ at each pixel is defined as $C_l$. Here, $C_g$ ranges between 0 and 1 and means a probability that the foreground/background binary map $\beta(x)$ is accurate and $C_l(x)$ means a probability that the foreground/background binary map $\beta(x)$ at a pixel x is accurate.

The brightness process using global confidence can be expressed as follows:

$$\begin{bmatrix} R \\ G \\ B \end{bmatrix}_{brightness} = (1+\alpha C_g \beta(x)) \begin{bmatrix} R \\ G \\ B \end{bmatrix}_{original} \quad (7)$$

In other words, a strong brightness process is performed when global confidence is high and a weak brightness process is performed when global confidence is low.

Similarly, the brightness process using local confidence can be expressed as follows:

$$\begin{bmatrix} R \\ G \\ B \end{bmatrix}_{brightness} = (1+\alpha C_l(x)\beta(x)) \begin{bmatrix} R \\ G \\ B \end{bmatrix}_{original} \quad (8)$$

Figure 6A:
FIGS. 6A through 6C illustrate an image processing result according to another exemplary embodiment of the present invention.
Figure 6B:
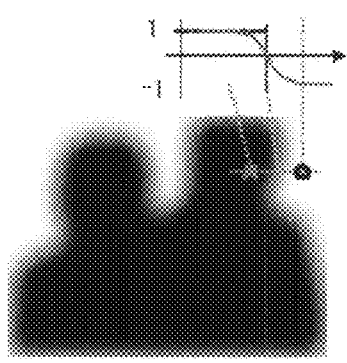
Figure 6C:

Here, as illustrated in FIGS. 5A and 6A, the foreground/background binary map discontinuously changes at a segmentation boundary, but the local confidence map continuously and smoothly changes at the segmentation boundary. When the foreground/background binary map causing the unnatural image illustrated in FIG. 5C is used, the image can be processed as illustrated in FIG. 6C by further using the continuously and smoothly changing local confidence map. Here, FIG. 6B illustrates $C_l(x)\beta(x)$.

Optionally, the global confidence $C_g$ and the local confidence map $C_l$ can be used at the same time, as follows:

$$\begin{bmatrix} R \\ G \\ B \end{bmatrix}_{brightness} = (1+\alpha C_g C_l(x)\beta(x)) \begin{bmatrix} R \\ G \\ B \end{bmatrix}_{original} \quad (9)$$

Figure 7:
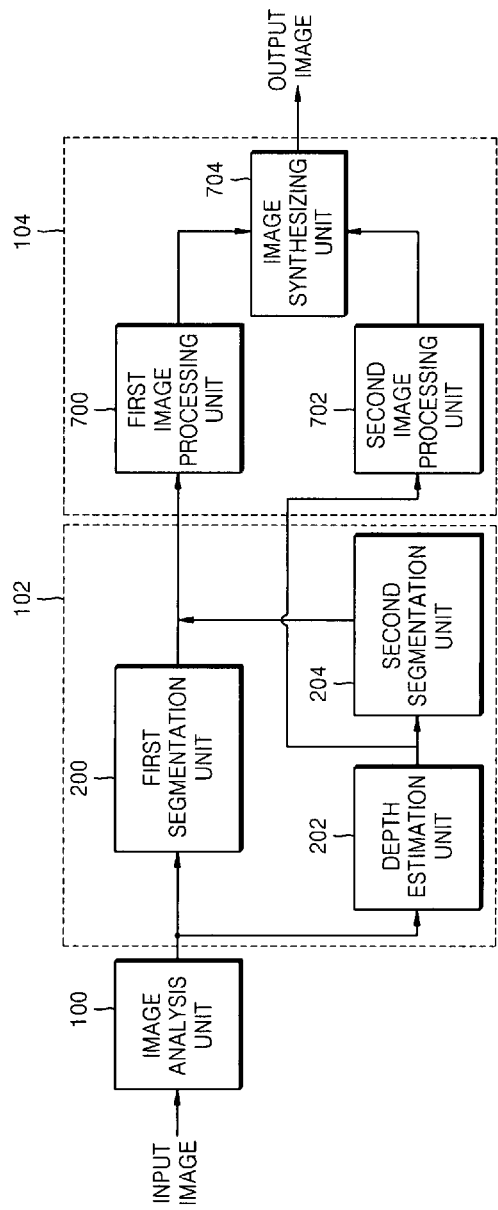
FIG. 7 is a schematic block diagram of an image processing system according to another exemplary embodiment of the present invention.

FIG. 7 is a schematic block diagram of an image processing system according to another exemplary embodiment of the present invention.

Referring to FIG. 7, the image processing system further includes an image processing unit 104 in addition to components of the image processing system illustrated in FIG. 2. The image processing unit 104 includes a first image processing unit 700, a second image processing unit 702, and an image synthesizing unit 704.

The image processing system illustrated in FIG. 7 enhances a 3D effect by using both region-based differential image processing and depth-based image processing. In particular, the image processing system analyzes an image to determine whether segmentation and depth estimation are available and performs segmentation and/or depth estimation based on the determination.

The first image processing unit 700 is provided with segmentation information, e.g., foreground/background information for mode [2], mode [3], and mode [6], from the first segmentation unit 200 and segmentation information, e.g., foreground/background information for mode [5], from the second segmentation unit 204, and performs region-based differential image processing.

The second image processing unit 702 receives image information for mode [4] and mode [5] in which depth estimation is available and performs image processing based on depth information. For depth-based image processing, brightness may be increased and decreased in proportion to depth as follows:

$$\begin{bmatrix} R \\ G \\ B \end{bmatrix}_{brightness} = (1+az+b) \begin{bmatrix} R \\ G \\ B \end{bmatrix}_{original}, \quad (10)$$

where (az+b) indicates the amount of change in brightness and is given as a linear function of depth z. By setting a to a negative number and b to a positive number, the brightness of a region including an object that is close to a camera is increased and the brightness of a region including an object that is distant from the camera is reduced.

An object that is distant from the camera may be blurred by increasing the density of fog. The fog process involves mixing the original color with gray fog having the same brightness as that of the original color, as follows:

$$\begin{bmatrix} R \\ G \\ B \end{bmatrix}_{fogging} = f \begin{bmatrix} R \\ G \\ B \end{bmatrix}_{original} + (1-f) \begin{bmatrix} \frac{R+G+B}{3} \\ \frac{R+G+B}{3} \\ \frac{R+G+B}{3} \end{bmatrix} \quad (11)$$

$$f = e^{-d_f z}, \quad (12)$$

where $d_f$ indicates the density of fog, and a color resulting from the fog process becomes similar to the gray color as the depth z increases. Alternatively, when blue fog, instead of gray fog, is used, a pixel can be rendered to appear deeper as the depth z increases based on a chromosteropsis effect, e.g., an effect that makes the blue color appear more distant than the red color.

Optionally, confidence-based image processing discussed with reference to FIG. 3 may also be used for depth estimation. In other words, by adjusting the strength of image processing in proportion to confidence, it is possible to prevent or minimize display quality degradation caused by an error in depth estimation.

The image synthesizing unit 704 receives an image signal that has been differentially processed for a foreground region and a background region from the first image processing unit 700 and an image signal that has been processed based on depth information from the second image processing unit 702 and synthesizes the processed image signals, thereby outputting an image having an improved 3D effect.

In short, an input image is analyzed to determine whether depth estimation and segmentation are available. Depth estimation and/or segmentation are performed according to the determination result. The 3D effect of the image is improved using the result of segmentation and/or depth estimation.

By using both region-based differential image processing and depth-based image processing, even when an image has no foreground region and thus cannot be segmented and differentially processed, a frame in which a camera moves can be processed based on depth, thereby enhancing the 3D effect of the image. When both segmentation and depth estimation are available, an image having a more improved 3D effect can be obtained by performing a 3D effect enhancing process using depth estimation together with a 3D effect enhancing process based on segmentation.

Figure 8:
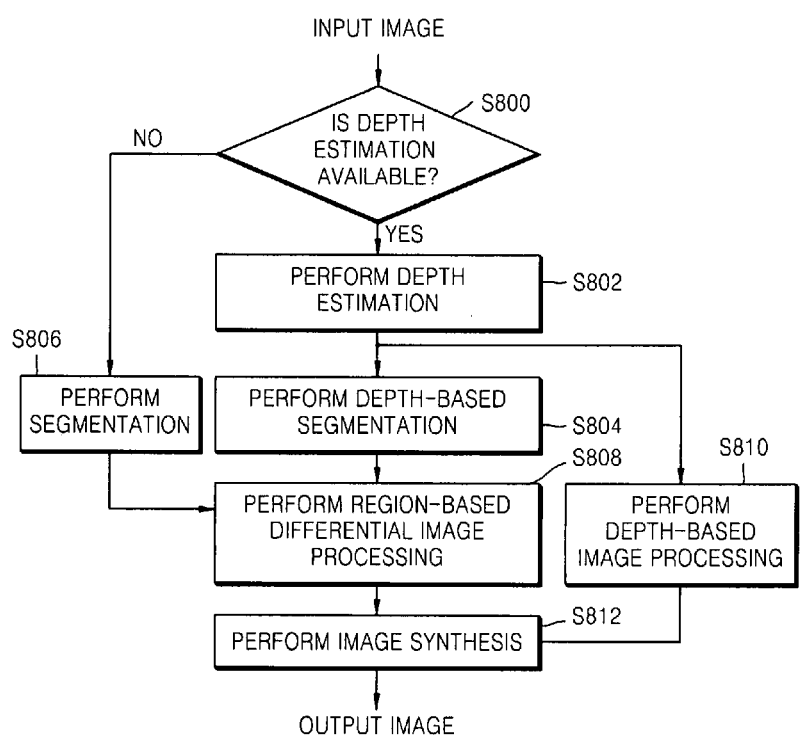
FIG. 8 is a flowchart illustrating an image processing method according to another exemplary embodiment of the present invention.

FIG. 8 is a flowchart illustrating an image processing method according to another exemplary embodiment of the present invention.

Referring to FIG. 8, an image processing system determines whether depth estimation for an input image is available in operation S800. If depth estimation is available, the image processing system estimates the depth of the image in operation S802, performs depth-based image processing in operation S810, and performs segmentation if depth-based segmentation is available in operation S804. If depth estimation is not available, the image processing system performs segmentation in operation S806. The image processing system differentially processes the segmented regions in operation S808. The image processing system synthesizes the region-based differentially processed image and the depth-based processed image and outputs the synthesized image in operation S812.

FIG. 9 is a flowchart illustrating an image processing method according to another exemplary embodiment of the present invention.

Referring to FIG. 9, an image processing system determines whether an input image includes movement of a camera in operation S900. If the camera moves, the image processing system determines whether the image contains an object that moves independently of the movement of the camera in operation S902. If there is no object that moves independently of the movement of the camera, the image processing system estimates the depth of the image in operation S904 and performs depth-based image processing in operation S914. If depth-based segmentation is available, the image processing system performs depth-based segmentation in operation S906. If the camera does not move, the image processing system performs segmentation in operation S908. If there is an object that moves independently of the movement of the camera, the image processing system performs segmentation in operation S910. The image processing system performs region-based differential image processing based on the segmentation results of operations S906, S908, and S910 in operation S912 and synthesizes the region-based differentially processed image and the depth-based processed image and outputs the synthesized image in operation S916.

Meanwhile, the present invention can also be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices.

According to the present invention, the feature of an image is detected, an image signal is analyzed based on the detected feature, segmentation is performed on the image signal according to the analysis result, and the image signal is processed based on the segmentation result. In this way, by effectively performing a segmentation algorithm suitable for the feature of an image for differential image processing, the 3D effect of the image can be improved.

Moreover, since it is determined whether segmentation and depth estimation are available based on the feature of an image, an appropriate 3D effect enhancing process can be performed on almost all the types of images.

Furthermore, global confidence and local confidence are estimated for segmentation or depth estimation and image processing is performed based on the estimated global confidence and local confidence, thereby preventing display quality degradation and obtaining a natural image.

Additionally, since an image having an excellent 3D effect can be generated using small binocular disparity for a 3D display or 3D TV that depends on binocular disparity, eyes' fatigue can be alleviated.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An image processing method comprising:
   (a) receiving an image signal from an image signal input device representing an image, detecting a feature of the image, and analyzing the image signal based on the detected feature of the image;

(a1) selectively estimating a depth of the image and obtaining depth distribution information of the image, according to the analysis result;

(b) performing segmentation on the image signal according to the analysis result and according to the estimated depth when estimating the depth of the image is performed; and (c) performing image processing, using a computer, on the image signal according to the segmentation result.

2. The image processing method of claim 1, wherein a foreground region and a background region of the segmented image are processed differentially.

3. The image processing method of claim 1, wherein the feature of the image includes at least one of motion of a camera taking the image and whether or not a foreground object that moves independently in the image exists.

4. The image processing method of claim 1, wherein (b) comprises estimating the confidence of the segmentation and (c) comprises performing image processing according to the segmentation result and the estimated confidence value.

5. The image processing method of claim 4, wherein the confidence is a confidence value for the segmentation.

6. The image processing method of claim 4, wherein the confidence is a confidence value for the segmentation with respect to each pixel of the image signal.

7. The image processing method of claim 1, wherein the image processing includes at least one of a brightness process, a focus process, a fog process, a sharpness process, a contrast process, an edge enhancing process, or a chromosteropsis process.

8. The image processing method of claim 1, wherein depth-based image processing is performed according to the estimated depth when estimating the depth of the image is performed.

9. The image processing method of claim 8, further comprising synthesizing the image signal processed according to the segmentation result and the image signal processed according to the depth of the image.

10. A non-transitory computer-readable recording medium having recorded thereon a program for implementing an image processing method as claimed in claim 1.

11. An image processing apparatus comprising:

an image analysis unit to receive an image signal representing an image from an image signal input device, to detect a feature of the image, and to analyze the image signal based on the detected feature of the image;

a segmentation unit to perform segmentation on the image signal according to the analysis result of the image analysis unit; and an image processing unit to perform, using a computer, image processing on the image signal according to the segmentation result of the segmentation unit, wherein the segmentation unit comprises a depth estimation unit to selectively estimate a depth of the image and to obtain depth distribution information of the image, according to the analysis result of the image analysis unit, and the segmentation unit performs segmentation on the image signal according to the estimated depth when estimating the depth of the image is performed.

12. The image processing apparatus of claim 11, wherein the segmentation unit further comprises:

a first segmentation unit to perform segmentation on the image signal according to a first image analysis signal input from the image analysis unit; and a second segmentation unit to receive depth information of the image from the depth estimation unit and to perform segmentation on the image signal according to the depth information, wherein, the depth estimation unit estimates the depth of the image and obtains depth distribution information of the image according to a second image analysis signal input from the image analysis unit.

13. The image processing apparatus of claim 11, further comprising a confidence estimation unit to receive segmentation information of the image signal from the segmentation unit and to estimate the confidence of the segmentation according to the segmentation information, wherein the image processing unit processes the image signal according to the segmentation result and the estimated confidence.

14. The image processing apparatus of claim 12, wherein the image processing unit comprises:

a first image processing unit to receive segmentation information of the image signal from the first segmentation unit and the second segmentation unit and to process the image signal according to the segmentation information;

a second image processing unit to receive the depth information from the depth estimation unit and to process the image signal according to the depth information; and an image synthesizing unit to synthesize the image processing results of the first image processing unit and the second image processing unit and to output the synthesis result.

15. The image processing apparatus of claim 11, wherein the image signal is a two-dimensional (2D) image signal.

16. The image processing apparatus of claim 11, wherein the feature of the image includes whether a device taking the image moves, whether a foreground object exists in the image, and whether the foreground object moves independently in the image if the foreground object does exist.

* * * * *

UNITED STATES PATENT AND TRADEMARK OFFICE
CERTIFICATE OF CORRECTION

PATENT NO.         : 8,290,264 B2
APPLICATION NO.    : 11/898205
DATED              : October 16, 2012
INVENTOR(S)        : Jun-mo Kim et al.

It is certified that error appears in the above-identified patent and that said Letters Patent is hereby corrected as shown below:

In the Claims:

Column 11; Line 32-33; In Claim 7, delete "chromosteropsis" and insert -- chromostereopsis --, therefor.

Signed and Sealed this
Fourteenth Day of May, 2013

Teresa Stanek Rea
*Acting Director of the United States Patent and Trademark Office*